United States Patent
Lehman et al.

(10) Patent No.: US 10,311,863 B2
(45) Date of Patent: Jun. 4, 2019

(54) CLASSIFYING SEGMENTS OF SPEECH BASED ON ACOUSTIC FEATURES AND CONTEXT

(71) Applicant: Disney Enterprises, Inc., Burbank, CA (US)

(72) Inventors: Jill Fain Lehman, Pittsburgh, PA (US); Nikolas Wolfe, Pittsburgh, PA (US); Andre Pereira, Pittsburgh, PA (US)

(73) Assignee: Disney Enterprises, Inc., Burbank, CA (US)

( * ) Notice: Subject to any disclaimer, the term of this patent is extended or adjusted under 35 U.S.C. 154(b) by 39 days.

(21) Appl. No.: 15/256,378

(22) Filed: Sep. 2, 2016

(65) Prior Publication Data

US 2018/0068656 A1    Mar. 8, 2018

(51) Int. Cl.
  *G10L 15/18*    (2013.01)
  *G10L 15/22*    (2006.01)
  *G10L 15/02*    (2006.01)
  *G10L 15/08*    (2006.01)

(52) U.S. Cl.
  CPC .......... *G10L 15/1815* (2013.01); *G10L 15/22* (2013.01); *G10L 15/02* (2013.01); *G10L 2015/088* (2013.01); *G10L 2015/223* (2013.01)

(58) Field of Classification Search
  CPC ......... G10L 15/22; G10L 15/26; G10L 15/20; G10L 2015/223; G10L 15/00; G10L 15/08; G10L 25/48
  See application file for complete search history.

(56) References Cited

U.S. PATENT DOCUMENTS

| 6,594,630 B1 * | 7/2003 | Zlokarnik | G10L 15/26 704/241 |
| 7,058,889 B2 * | 6/2006 | Trovato | G10H 1/368 348/E5.002 |
| 9,270,964 B1 * | 2/2016 | Tseytlin | H04N 9/806 |

(Continued)

OTHER PUBLICATIONS

Singh, Rita and Raj, Bhiksha. "Classification in Likelihood Spaces," School of Computer Science, Carnegie Mellon University, Pittsburgh, PA, and Mitsubishi Electric Research Laboratories, Cambridge, MA. Aug. 2004, pp. 1-23.

*Primary Examiner* — Richemond Dorvil
*Assistant Examiner* — Mark Villena
(74) *Attorney, Agent, or Firm* — Farjami & Farjami LLP

(57) ABSTRACT

There is provided a system including a microphone configured to receive an input speech, an analog to digital (A/D) converter configured to convert the input speech to a digital form and generate a digitized speech including a plurality of segments having acoustic features, a memory storing an executable code, and a processor executing the executable code to extract a plurality of acoustic feature vectors from a first segment of the digitized speech, determine, based on the plurality of acoustic feature vectors, a plurality of probability distribution vectors corresponding to the probabilities that the first segment includes each of a first keyword, a second keyword, both the first keyword and the second keyword, a background, and a social speech, and assign a first classification label to the first segment based on an analysis of the plurality of probability distribution vectors of one or more segments preceding the first segment and the probability distribution vectors of the first segment.

16 Claims, 5 Drawing Sheets

(56) References Cited

U.S. PATENT DOCUMENTS

| | | | | |
|---|---|---|---|---|
| 2002/0163533 | A1* | 11/2002 | Trovato | G10H 1/368 715/728 |
| 2004/0093219 | A1* | 5/2004 | Shin | B25J 9/0003 704/275 |
| 2005/0105795 | A1 | 5/2005 | Singh | |
| 2006/0085190 | A1* | 4/2006 | Gunawardana | G10L 15/14 704/256.3 |
| 2006/0210157 | A1* | 9/2006 | Agnihotri | G06F 17/30793 382/173 |
| 2008/0069437 | A1* | 3/2008 | Baker | G06K 9/6256 382/159 |
| 2009/0326947 | A1* | 12/2009 | Arnold | G06Q 30/02 704/257 |
| 2012/0059650 | A1* | 3/2012 | Faure | G10L 25/69 704/226 |
| 2013/0231933 | A1 | 9/2013 | Hajishirzi | |
| 2013/0304479 | A1* | 11/2013 | Teller | G06F 3/013 704/275 |
| 2014/0337024 | A1* | 11/2014 | Zuo | G10L 15/1822 704/239 |
| 2015/0025887 | A1* | 1/2015 | Sidi | G10L 17/02 704/245 |
| 2015/0066496 | A1* | 3/2015 | Deoras | G10L 15/16 704/232 |
| 2015/0287406 | A1* | 10/2015 | Kristjansson | G10L 15/20 704/233 |
| 2015/0371638 | A1* | 12/2015 | Ma | G10L 15/065 704/275 |
| 2016/0048934 | A1* | 2/2016 | Gross | G06K 9/00637 705/313 |
| 2016/0111090 | A1* | 4/2016 | Holdren | G10L 15/20 704/251 |
| 2016/0379633 | A1 | 12/2016 | Lehman | |
| 2017/0034107 | A1* | 2/2017 | Krishnaswamy | H04L 51/32 |
| 2017/0061959 | A1 | 3/2017 | Lehman | |

\* cited by examiner

CLASSIFYING SEGMENTS OF SPEECH BASED ON ACOUSTIC FEATURES AND CONTEXT

BACKGROUND

As speech recognition technology has advanced, voice-activated devices have become more and more popular and have found new applications. Today, an increasing number of mobile phones, in-home devices, and automobile devices include speech or voice recognition capabilities. Although the speech recognition modules incorporated into such devices are trained to recognize specific keywords, they tend to be unreliable. This is because the specific keywords may appear in a spoken sentence and be incorrectly recognized as voice commands by the speech recognition module when not intended by the user. Also, in some cases, the specific keywords intended to be taken as commands may not be recognized by the speech recognition module, because the specific keywords may be ignored for appearing in between other spoken words. Of course, both situations can frustrate the user and cause the user to give up or resort to inputting the commands manually, speak the keywords numerous times, or turn off the voice recognition.

SUMMARY

The present disclosure is directed to classifying segments of speech based on acoustic features and context, substantially as shown in and/or described in connection with at least one of the figures, as set forth more completely in the claims.

DETAILED DESCRIPTION

Figure 1:
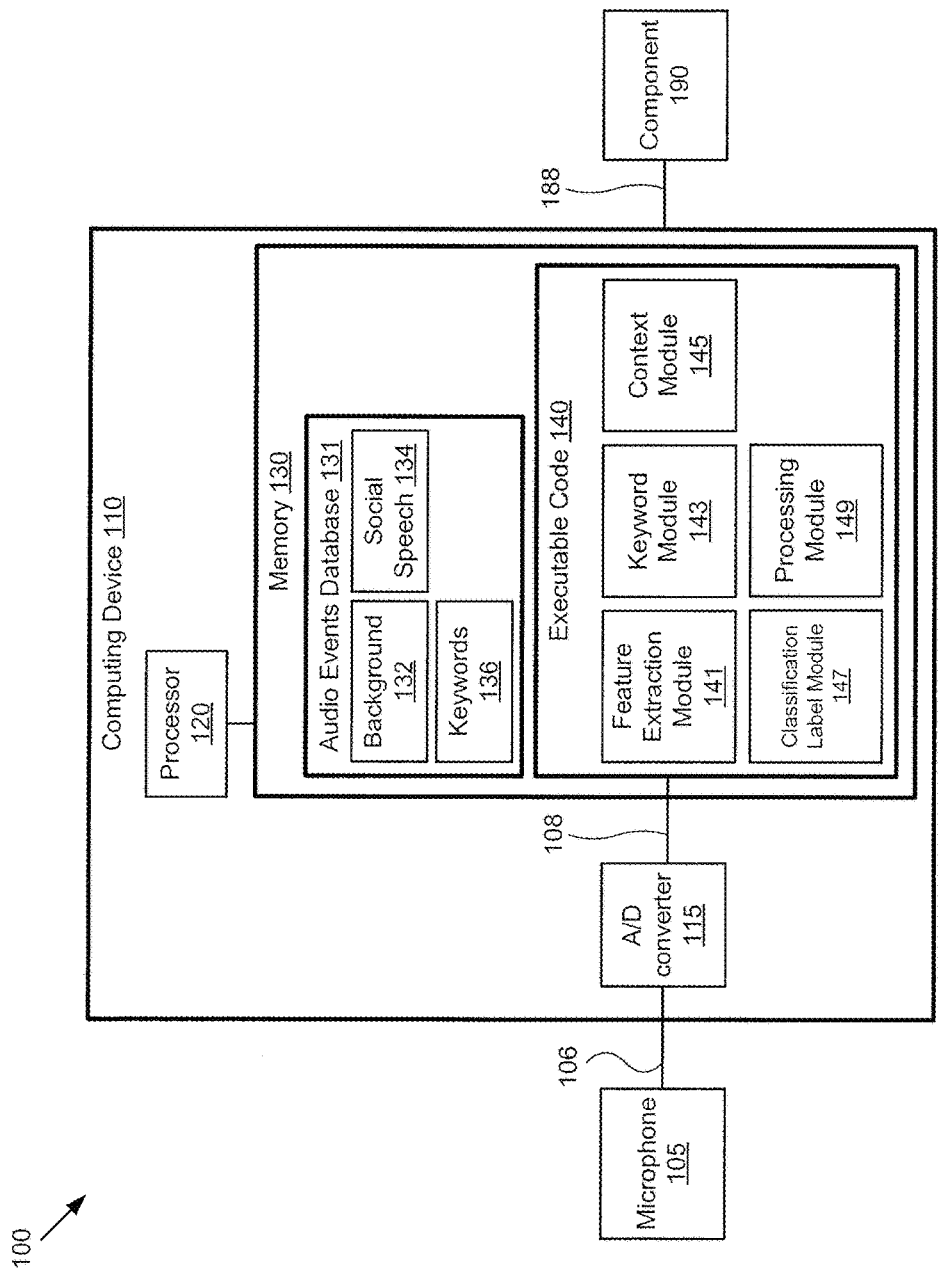
FIG. 1 shows a diagram of an exemplary system for classifying segments of speech based on acoustic features and context, according to one implementation of the present disclosure.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 shows a diagram of an exemplary system for classifying segments of speech based on acoustic features and context, according to one implementation of the present disclosure. System 100 includes microphone 105, computing device 110, and component 190, which can be any mechanical, electrical or electromechanical component. System 100 may be a video game system, a robot, an automated appliance, such as a radio or a kitchen appliance, or any other device or equipment that can be command-controlled. For example, system 100 may be a video game system configured to receive play instructions from one or more users by speech or voice commands, or an oven configured to receive operating instructions by speech or voice commands. Computing device 110 includes analog-to-digital (A/D) converter 115, processor 120, and memory 130.

System 100 uses microphone 105 to receive speech or voice commands from a user. A/D converter 115 is configured to receive input speech or audio 106 from microphone 105, and to convert input speech or audio 106, which is in analog form, to digitized speech 108, which is in digital form. As shown in FIG. 1, A/D converter 115 is electronically connected to executable code 140, such that A/D converter 115 can send digitized speech 108 to executable code 140. Using A/D converter 115, analog audio signals or input speech 106 may be converted into digital signals or digitized speech 108 to allow executable code 140 to recognize spoken words and phrases. This is typically accomplished by pre-processing digitized speech 108, extracting features from the pre-processed digitized speech, and performing computation and scoring to match extracted features of the pre-processed digitized speech with keywords.

Processor 120 is a hardware processor, such as a central processing unit (CPU) used in computing device 110. Processor 120 may be configured to access memory 130 to store received input or to execute commands, processes, or programs stored in memory 130, such as feature extraction module 141, keyword module 143, context module 145, classification label module 147, and processing module 149. Processor 120 may correspond to a control processing unit, such as a microprocessor or similar hardware processing device, or a plurality of hardware devices. Although FIG. 1 shows a single processor, namely processor 120, in other implementations, keyword module 143, context module 145, classification label module 147, and processing module 149 may be executed by different processors. Memory 130 is a non-transitory storage device capable of storing commands, processes, data and programs for execution by processor 120. As shown in FIG. 1, memory 130 includes audio events database 131 and executable code 140. In one implementation, at least some programs and data may be stored in a cloud-based storage device. For example, in one implementation digitized speech 108 may be transmitted over a communication network, such as the Internet, to a server including executable code 140 for processing digitized speech 108, and returning the result to system 100 for controlling component 190.

Audio events database 131 is a database storing data and parameters related to audio events. In some implementations, audio events database 131 may include features related to various audio events, and may include feature vectors corresponding to such audio events. In one implementation, audio events database 131 may store probabilistic models of each audio event which can be used to compute the probability that a segment of digitized speech 108 contains a first keyword, a second keyword, both the first keyword and the second keyword, social speech, or background. Audio events database 131 may be trained on various audio events that may occur in an area near a location where system 100 may be used, and may learn probabilistic models of acoustic features corresponding to audio events based on the training. For example, if system 100 is a video game system played by two players, one player assigned the command "go" to advance a character in the game and the other player assigned the command "jump" to cause the character to jump, audio events database 131 may be trained by recording a plurality of players playing the video game. In one implementation, training may include two children playing the video game together. In another implementation, training may include one child playing the video game in cooperation with a robot companion. The resulting training data may include instances of a first command, e.g., go, or a second command, e.g., jump, spoken independently, instances of both the first and the second commands spoken together, either partially or completely overlapping, instances of social speech between the players, and instances of background speech and/or background sounds in the environment.

Audio events database 131 may include background 132, social speech 134, and keywords 136. Background 132 may include data, such as probabilistic models of acoustic features and/or feature vectors corresponding to background sounds and noises, which do not belong to keywords or other acoustic events of interest for detection. In one implementation, background 132 includes an explicit model for background. Social speech 134 may include acoustic features and/or feature vectors corresponding to social speech, such as social speech between the players and/or social speech of others nearby system 100. In one implementation, social speech 134 includes an explicit model for social speech. Examples of social speech may be recorded during gameplay in the training environment. Keywords 136 may include acoustic features and/or feature vectors corresponding to one or more keywords. In some implementations, keywords are words that, in the right context, may be commands to an external system, which consumes them as input, such as a game or robot. For example, in the example of the video game, the word "go" is a keyword because it may be spoken as a command to advance the character in the video game, although it may also be used in social speech between players of the video game and/or background speech.

Executable code 140 may include one or more modules for execution by processor 120. As shown in FIG. 1, executable code 140 includes feature extraction module 141, keyword module 143, context module 145, classification label module 147, and may optionally include processing module 149. Feature extraction module 141 is a software module stored in memory 130 for execution by processor 120 to extract acoustic features from digitized speech 108. In some implementations, feature extraction module 141 may extract acoustic features from one or more segments of digitized speech 108. In one implementation, feature extraction module 141 may extract overlapping blocks of Mel-frequency cepstral coefficient (MFCC) vectors for each segment of digitized speech 108. Mel-frequency cepstral coefficient (MFCC) vectors may represent the short-term power spectrum of each segment of digitized speech 108 based on a linear cosine transform of a log power spectrum on a nonlinear mel scale of frequency. In some implementations, acoustic features of digitized speech 108 may be represented as feature vectors with each component of each feature vector represented by a real number. Feature extraction module 141 may output a plurality of acoustic feature vectors corresponding to each segment of digitized speech 108. Feature extraction module 141 may represent acoustic features of digitized speech 108 using one or more feature vectors with each component of each feature vector represented by a real number. In one implementation, if a segment of digitized speech 108 is 150 ms long, and feature extraction module 141 computes an acoustic feature vector every 10 ms, feature extraction module 141 may extract 15 MFCC vectors for each segment of digitized speech 108.

Keyword module 143 is a software module stored in memory 130 for execution by processor 120 to determine probabilities that each segment of digitized speech 108 is one of various audio events. Keyword module 143 may produce a plurality of posterior probability distribution vectors for each segment of digitized speech 108. In some implementations, the plurality of probability distribution vectors may include a probability that each segment includes the first keyword, a probability that each segment includes the second keyword, a probability that each segment includes both the first keyword and the second keyword, a probability that each segment is social speech, and a probability that each segment is background, such that the sum of the probabilities for each segment is 1.0. In some implementations, keyword module 143 may determine the probability distribution vectors for each segment of digitized speech 108 based on the acoustic feature vectors received from feature extraction module 141 in combination with the probabilistic models corresponding to each audio event stored in audio events database 131.

Keyword module 143 may be configured to recognize keywords. Keyword module 143 may be configured to identify keywords corresponding to the any of the one or more keywords included in keywords 136. Keywords 136 may include words, or combinations of words. In some implementations, keywords 136 may include English words, English phrases, non-English words, non-English phrases, or words and phrases in a plurality of languages. A keyword may be a single word, a series of words, an instruction, a command, or a combination of words. A keyword may include commands or instructions, such as "go" or "jump," and may be instructions to direct a character or avatar in a video game. In some implementations, keywords may include commands or instructions to control or program an appliance, such as "preheat oven to 350°" or "tune radio to 106.7 FM," or "turn oven on at 5:30 pm, preheat to 350°."

Some devices utilizing speech recognition require a quick response when a keyword is spoken. For example, system 100 may be used to support language-based interaction between a child and a robot cooperatively playing a fast-paced video game in real-time. While playing the video game, the time between a user speaking a keyword and the implementation of an action associated with the keyword should be minimized. In some implementations, a video game may have obstacles or opponents that move across the screen towards a player's avatar, and if the obstacle or opponent contacts the character or avatar, a negative consequence may occur, such as a loss of health or death of the character in the video game. Accordingly, the user may desire a video game system that reacts quickly when the user utters a keyword intended as an instruction. In some implementations, keyword module 143 may be continuously listening for keywords found in keywords 136, and when keyword module 143 detects a keyword, keyword module 143 may initiate a process for executing an action associated with the identified keyword. In some implementations, keyword module 143 may always be listening, even if system 100 is not actively in use. For example, a smart oven may be always on, such that a user is able to simply speak the instruction "preheat oven to 350°" to initiate preheating of the oven without first manually interacting with the oven to activate executable code 140. In some implementations, keyword module 143 may be continuously listening only while system 100 is in use. In some implementations, context module 145 may be configured to begin listening when the speech input signal is received from microphone 105.

Context module 145 is a software module stored in memory 130 for execution by processor 120 to select one or more segments of digitized speech 108 preceding the current segment and concatenate the probability distribution vectors extracted from the one or more segments of digitized speech 108 preceding the current segment. In some implementations, context module 145 may receive posterior probability vectors corresponding to a current segment of digitized speech 108 and/or one or more prior segments of digitized speech 108 from keyword module 143. Prior segments of digitized speech 108 may include one or more segments sequentially preceding the current segment. Context module 145 may concatenate the posterior probability vectors from the one or more segments of digitized speech 108 to provide a context for the current segment of digitized speech 108.

Classification label module 147 is a software module stored in memory 130 for execution by processor 120 to assign one or more classification labels to each segment of digitized speech 108. Classification label module 147 may be configured to analyze the context of a keyword in digitized speech 108. In some implementations, classification label module 147 may determine whether the current segment of digitized speech 108 should be considered a command or an instruction in view of the context as determined by context module 145. Such an analysis may be useful to distinguish between the video game command "go" and background speech including a conversation about an intention to "go" to the store. The context of a keyword may include words before the keyword, words after the keyword, or an absence of words before or after the keyword. Accordingly, in one implementation, context module 145 may also include a Voice Activity Detector (VAD) for detecting silence for determining and/or analyzing a context of identified keywords. The context of a keyword is not limited to the words spoken before and after the keyword, but context may also include additional information, as discussed in U.S. patent application Ser. No. 14/754,457 filed Jun. 29, 2015, which is hereby incorporated by reference in its entirety.

In other implementations, classification label module 147 may analyze a context of a keyword based on probabilities corresponding to prior segments of digitized speech 108. For example, keyword module 143 may calculate probabilities that a current segment of digitized speech 108 includes a first keyword, a second keyword, both the first keyword and the second keyword, social speech, or background. In some implementations, classification label module 147 may learn patterns of probabilities that correspond to an increase or decrease of the likelihood that a keyword is spoken as a command and store the learned patterns in audio events database 135. Classification label module 147 may analyze the context of the current segment based on the posterior probability vectors corresponding to each of one or more preceding segments of digitized speech 108. Classification label module 147 may compare the sequence of probabilities including the one or more preceding segments of digitized speech 108 and the current segment with patterns of probabilities learned in training. Based on learned patterns of probabilities stored in audio events database 131 and the sequence of probabilities in digitized speech 108, classification label module 147 may determine the current segment of digitized speech 108 includes one or both of the first keyword and the second keyword, social speech, or background.

In some implementations, classification label module 147 may receive a plurality of posterior probability distribution vectors from keyword module 143. The plurality of posterior probability distribution vectors may include a plurality of consecutive posterior probability distribution vectors from the segments of digitized speech sequentially preceding the current segment. In some implementations, classification label module 147 may include a discriminative classification machine, such as a support vector machine (SVM), for learning parameters for each classification label and assigning the appropriate classification label to each segment of digitized speech 108. Parameters learned for each classification label may be stored in audio events database 131. The output of the SVM may include a classification label for each segment of digitized speech 108 based on the probability that the current segment includes one or both of the first keyword and the second keyword, social speech, or background and the plurality of posterior probability distribution vectors received from keyword module 143.

Processing module 149 is a software module stored in memory 130 for execution by processor 120 to optionally determine whether to transmit an event marker, such as a command, to component 190. Processing module 149 may determine when to initiate a process for executing an action associated with an identified keyword in keywords 136. Processing module 149 may act as a gatekeeper to determine whether to execute the action associated with the keyword. In some implementations, processing module 149 receives input from keyword module 143 and context module 145, and processing module 149 determines when to proceed with a process for an action associated with the keyword.

When keyword module 143 identifies a keyword in digitized speech 108, keyword module 143 may initiate a process for executing an action associated with the identified keyword. At the same time, and in parallel with keyword module 143, context module 145 may analyze the keyword in digitized speech 108. When context module 145 identifies a keyword, context module 145 may analyze the context of the identified keyword. Based on the context determined by context module 145, processing module 149 may determine that the identified keyword is not an instruction, but instead part of a social conversation. In this situation, processing module 149, acting as a gatekeeper, may prevent keyword module 143 from initiating a process for executing a command, terminate the process if already initiated, or allow the action associated with the keyword to be executed. In some implementations, the action associated with the keyword may include sending output signal 188 to component 190, which may be a display, a robot arm, a heating part of an oven, etc.

Component 190 may be a visual output, an audio output, a signal, or a functional, mechanical or moving element of system 100 that may be instantiated by execution of the action associated with the keyword. In some implementations, component 190 may be a display, such as a computer monitor, a television, the display of a tablet computer, the display of a mobile telephone, etc. In some implementations, component 190 may be a speaker, such as a speaker in a home stereo, a car stereo, in headphones, in a device with a display as above, or any device having a speaker. In some implementations, component 190 may be a functional component of system 100, such as a heating element of an oven, an electric motor of a fan, a motor of an automatic door, or other device that may be found in a smart home. In some implementations, component 190 may comprise an individual component or a plurality of components.

Figure 2:
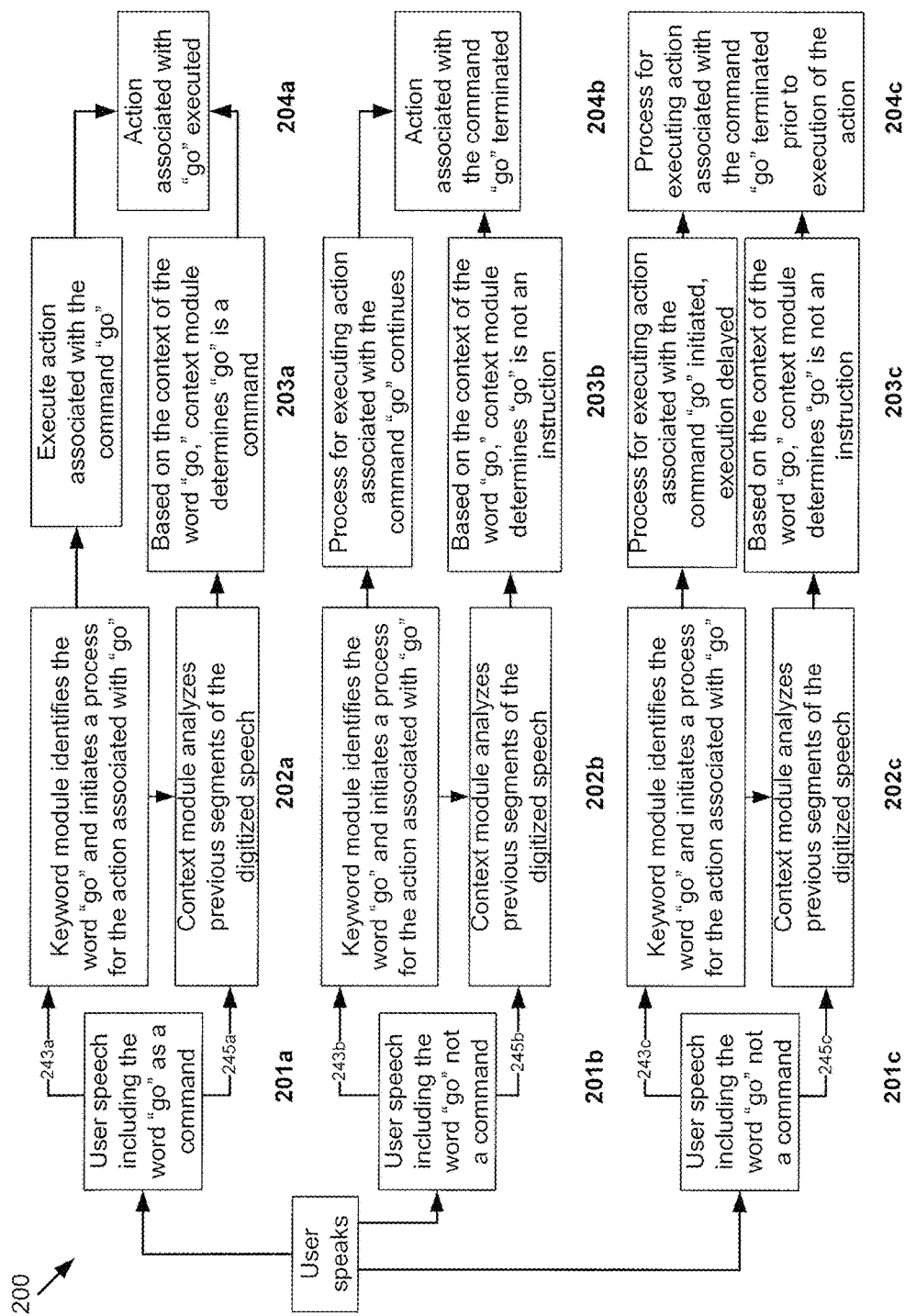
FIG. 2 shows an exemplary operational flow diagram for classifying segments of speech based on acoustic features and context using the system of FIG. 1, according to one implementation of the present disclosure.

FIG. 2 shows an exemplary operational flow diagram for classifying segments of speech based on acoustic features and context using the system of FIG. 1, according to one implementation of the present disclosure. Flow diagram 200 depicts three distinct scenarios. The operational flow diagram begins with the user speaking or uttering one or more words, where 201a/201b/201c show the spoken word(s), and two outgoing arrows depict the parallel processes of keyword module 143 and context module 145. At 202a/202b/202c, keyword module 143 and context module 145 process digitized speech 108 received from A/D converter 115. At 203a/203b/203c, keyword module 143 identifies keywords and context module 145 analyzes a context of the identified keywords. In some implementations, context module 145 may receive input from keyword module 143 indicating that a keyword has been identified. In other implementations, context module 145 may independently identify the keyword. At 204a/204b/204c, processing module 149 determines whether to proceed with the execution of an action associated with identified keyword(s).

More specifically, at 201a, the user utters the word "go" intended as a command. At 202a, keyword module 243a identifies the keyword "go" and initiates a process for executing an action associated with the keyword "go." In one implementation, context module 245a, may receive an indication from keyword module 243a that the keyword "go" has been identified, and analyze the context of the keyword. In another implementation, context module 245a may itself identify the keyword "go" and analyze the context of the keyword. At 203a, keyword module 243a sends a signal to processing module 149 to initiate an action associated with the keyword "go." In addition, context module 245a analyzes a context of the keyword and determines, based on the context of the keyword, that the keyword is more likely an instruction. As a result, context module 245a sends a signal to processing module 149 to proceed with executing the action. At 204a, processing module 149 proceeds with the action associated with the keyword "go" to actuate component 190.

In one implementation, context module 245a may determine the context for the identified keyword based on one or more words uttered before and/or after the keyword, e.g. using a VAD or spotting the uttered words. In another implementation, context module 245a may determine the context of the keyword based on the probability that one or more preceding segments of digitized speech 108 is a keyword, social speech, or background.

Turning to another example, at 201b, the user utters the keyword "go," and may also utter a few other words before and/or after the keyword. Words uttered before and/or after the keyword may be used to determine a context of the keyword for calculating the probability of the keyword being an instruction. At 202b, keyword module 243b identifies the keyword "go" and initiates a process for executing an action associated with the keyword "go." Context module 245b, may receive an indication from keyword module 243b regarding the identified keyword, or in another implementation, context module 245b may identify the keyword "go," and further analyzes the context of the keyword to determine whether the identified keyword should be classified as a command or instruction. At 203b, keyword module 243b continues the process for executing the action associated with the keyword "go," and context module 245a determines that the identified keyword is most likely not an instruction, based on the words spoken before the word "go." In one implementation, context module 245b may determine the context of the keyword based on the probability that one or more preceding segments of digitized speech 108 is a keyword, social speech, or background.

In response to receiving the inputs from keyword module 243b and context module 245b, at 204b, processing module 149 terminates the action associated with the keyword "go." In some implementations, termination of the action associated with the keyword may include ending the process initiated to execute the action associated with the keyword. For example, if the action were to preheat an oven to 350°, the oven may begin preheating and then the process of preheating may be terminated by turning off the heating element. In some implementations, termination of the action associated with the keyword may occur after execution of the action has occurred or begun to occur, and thus termination may include executing an action negating the action associated with the keyword. For example, if the action were to open a door, processing module 149 may terminate the action associated with the keyword "go" (terminate opening the door), and an action closing the door may be executed, thereby negating the initial action of beginning to open the door.

In another example, at 201c, the user utters the keyword "go." At 202c, keyword module 243c identifies the keyword "go," and initiates a process for an action associated with the keyword "go" to be taken by component 190. Context module 245c, operating along with keyword module 243c, may also identify the keyword "go," or may receive an indication from keyword module 243c that the keyword "go" has been identified. In response, context module 245c determines the context of the keyword. For example, context module 245c may determine the context of the keyword based on the probability that one or more preceding segments of digitized speech 108 is a keyword, social speech, or background.

In the example of 203c, keyword module 243c continues the process for executing the action associated with the keyword "go," and context module 245c determines, based on the context of the keyword, that the keyword is more likely not an instruction. As such, at 204c, processing module 149 may terminate the process for executing the action associated with the keyword "go" before execution of the action by component 190 has begun.

Figure 3:
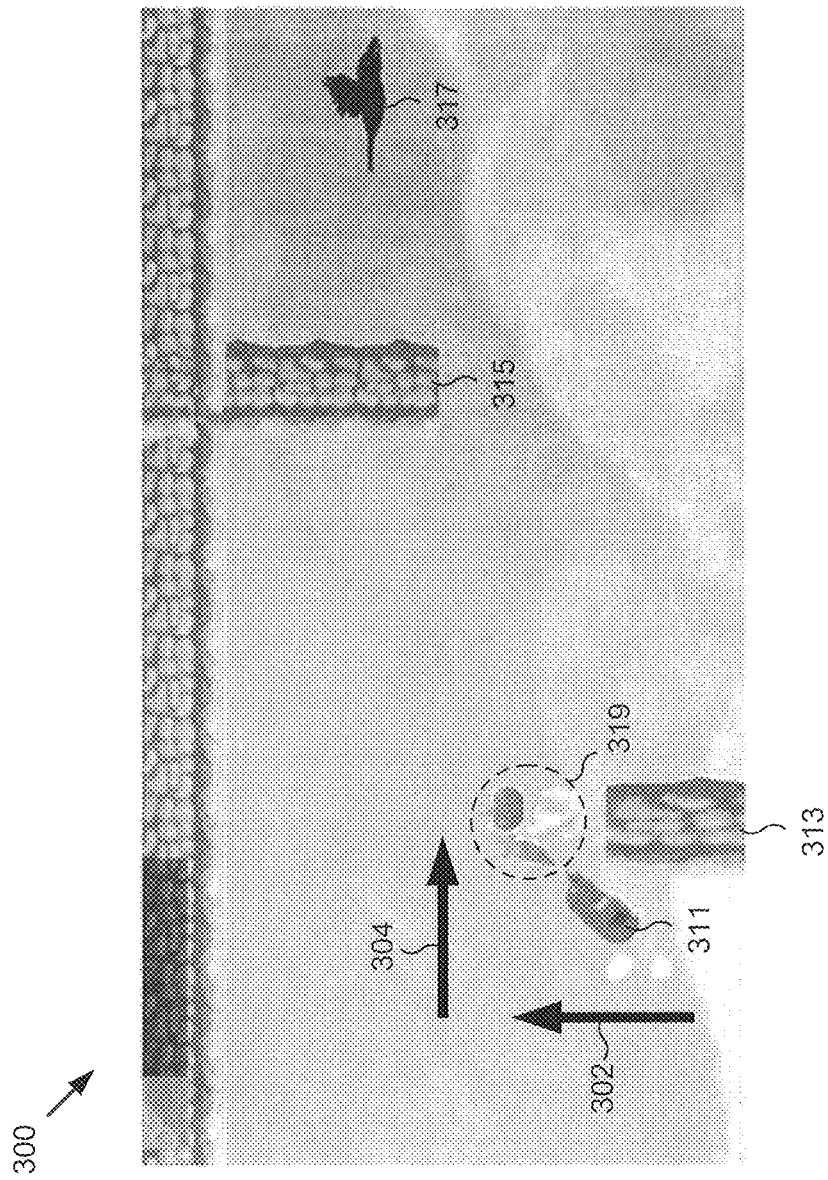
FIG. 3 shows a diagram of an exemplary voice-controlled video game using the system of FIG. 1, according to one implementation of the present disclosure.

FIG. 3 shows a diagram of an exemplary voice-controlled video game using the system of FIG. 1, according to one implementation of the present disclosure. Diagram 300 shows a screen shot of a video game involving character 311. A first user and a second user of system 100 may control character 311 using speech or voice commands. For example, the first user may speak the command "go" to advance character 311 forward in the game in direction 304. The second user may speak the command "jump" to move character 311 in direction 302. In some implementations, the first user and the second user may speak the commands, such that the command spoken by the first user and the command spoken by the second user at least partially overlap, resulting in concurrent motion in both direction 302 and direction 304, allowing character 311 to navigate over obstacles such as obstacle 313. In some implementations, the video game may include stationary obstacles, such as obstacle 313 and obstacle 315, and moving obstacles, such as bird 317. The users may navigate the video game to advance past stationary obstacles 313 and 315, avoid contacting moving obstacles, such as bird 317, and collect rewards to gain points and increase energy, such as vegetables 319.

Figure 4:
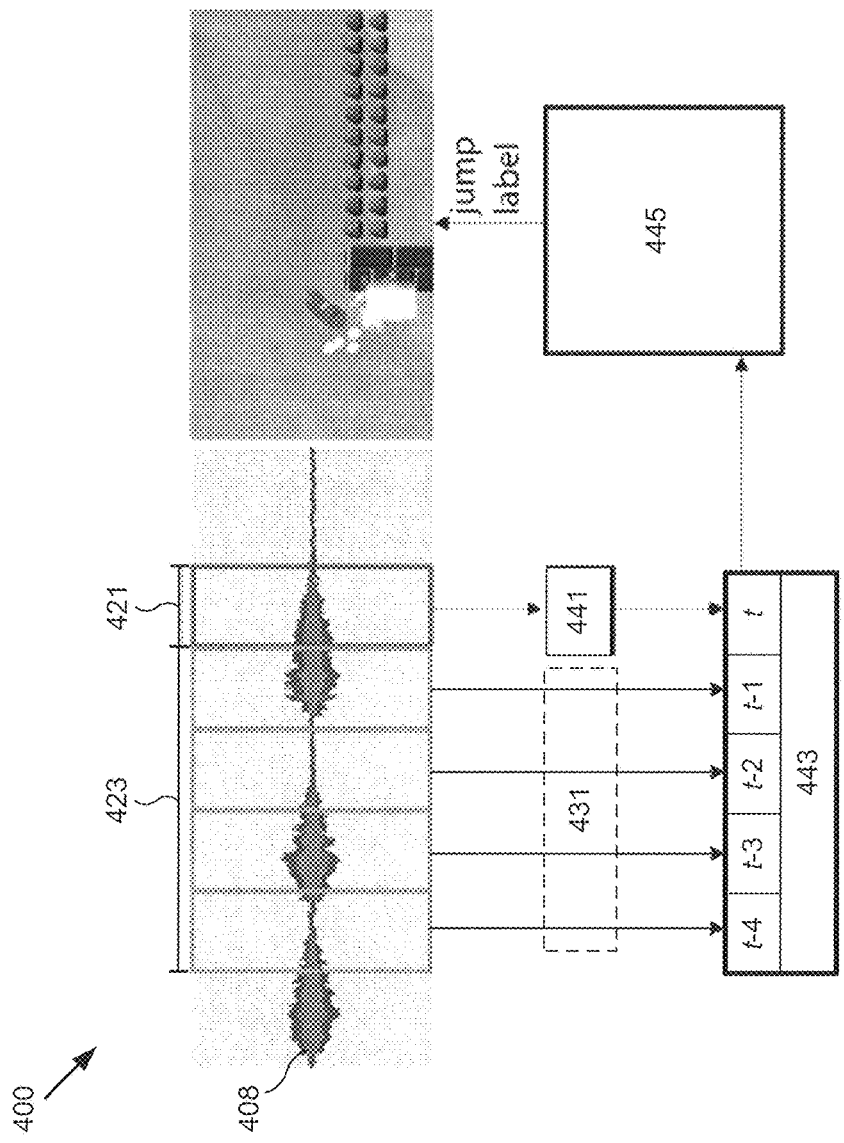
FIG. 4 shows a diagram depicting an exemplary process of controlling a video game using voice in the system of FIG. 1, according to one implementation of the present disclosure.

FIG. 4 shows a diagram depicting an exemplary process of controlling a video game using voice in the system of FIG. 1, according to one implementation of the present disclosure. Diagram 400 shows segmentation of digitized speech 408 including previous segments 423 and current segment 421. In some implementations, each segment of digitized speech 408 may have a duration, such as 150 ms. Feature extraction module 441 may extract a plurality of features from current segment 421. In some implementations, the extracted features may be saved into audio events database 431. As indicated by the arrows from each segment of previous segments 423, features from each of previous segment have been extracted and stored in audio events database 431, with features from each previous segment indexed relative to current segment 421.

Keyword module 443 may analyze the features extracted from current segment 421 and each of previous segments 423 to identify when a keyword is partially or completely spoken in one or more of the segments of digitized speech 408. Context module 445 may analyze the context of the keyword identified in the current segment based on the features extracted from each of the previous segments 423. Context module 445 may analyze the context of the keyword based on features of one or more previous segments, such as the probability that each segment of previous segments 423 includes one of a first keyword, a second keyword, both the first keyword and the second keyword, social speech, or background. Based on the keyword identified by keyword module 443 and the context analyzed by context module 445, current segment 421 may be assigned the classification label jump, and the command jump may be executed in the video game.

Figure 5:
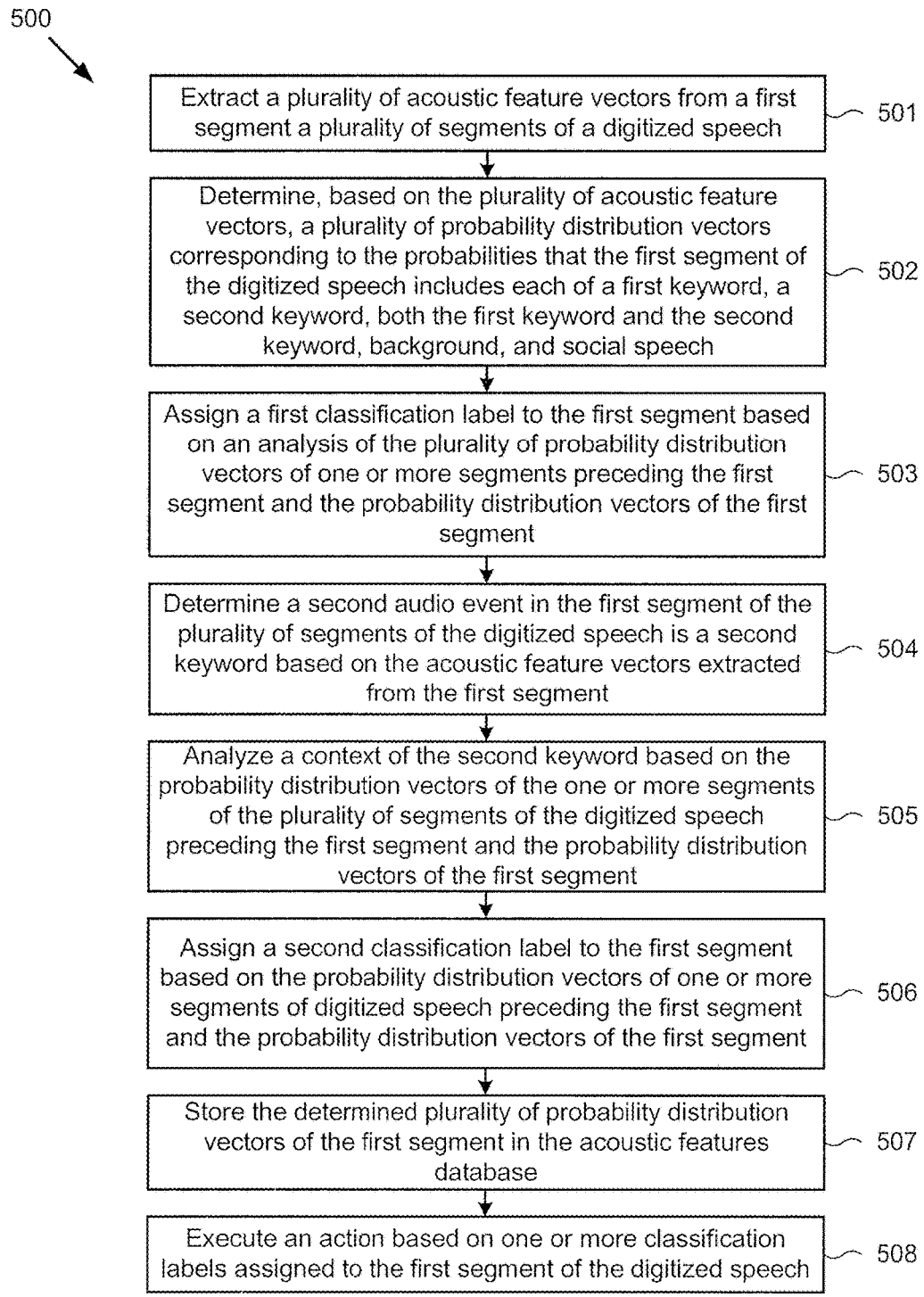
FIG. 5 shows a flowchart illustrating an exemplary method for classifying segments of speech based on acoustic features and context, according to one implementation of the present disclosure.

FIG. 5 shows a flowchart illustrating an exemplary method for classifying segments of speech based on acoustic features and context, according to one implementation of the present disclosure. Method 500 begins at 501, where executable code 140 extracts a plurality of acoustic feature vectors from a current segment of digitized speech 108. In some implementations, feature extraction module 141 may extract a plurality of acoustic feature vectors from each segment of the plurality of segments of digitized speech 108. For example, feature extraction module 141 may extract an acoustic feature vector for every 10 ms time step of digitized speech 108, and each segment may be 150 ms long, resulting in fifteen (15) acoustic feature vectors extracted from the current segment of digitized speech 108. In some implementations, one or more of the acoustic feature vectors extracted from each segment of digitized speech 108 may correspond with an audio event included in the segment. For example, when computing device 110 is a video game system, a segment of digitized speech 108 may include audio events corresponding to ambient sounds in the environment and/or conversation of non-players conversationally speaking in the room where computing device 110 is located, audio events corresponding to game players socially speaking, and/or audio events corresponding to a user speaking a command to control the video game.

At 502, executable code 140 determines a plurality of probability distribution vectors corresponding to the probabilities that the current segment of digitized speech 108 includes each of a first keyword, a second keyword, both the first keyword and the second keyword, background, and social speech. Method 500 continues at 503, where executable code 140 assigns a first classification label to the current segment based on an analysis of the plurality of probability distribution vectors of one or more segments of digitized speech 108 preceding the current segment and the probability distribution vectors of the current segment.

In one implementation, classification label module 147 may analyze the context of the current segment by looking at acoustic feature vectors corresponding to audio events occurring in one or more segments of digitized speech 108 preceding the current segment. Classification label module 147 may analyze the context of the current segment by comparing the probability distribution vectors for each classification label in one or more preceding segments of digitized speech 108 and the probabilities of each classification label in the current segment of digitized speech 108 with learned patterns of probabilities stored in audio events database 131. Audio events in segments preceding the current segment may indicate whether a keyword occurring in the current segment is intended as a command, or is a part of background or social speech. For example, when one or more segments sequentially preceding the current segment include audio features of social speech, the likelihood that the current segment is part of social speech increases. Classification label module 147 may compare patterns of probabilities occurring in preceding segments of digitized speech 108 and the probabilities in the current segment with patterns of probabilities learned in training and stored in audio events database 131.

In some implementations, classification label module 147 may compare the probabilities of each classification label in the current segment of digitized speech 108 and the probabilities of each classification label in one or more previous segments of digitized speech 108 with the learned patterns of probabilities in audio events database 131. Audio events database 131 may be trained on a plurality of examples of the first keyword included in background sounds, social speech, and when the first keyword is spoken as a command. Based on the training and the analyzed context of the current segment, executable code 140 may determine the first keyword spoken in the current segment is a command, is a part of social speech, is a part of background sounds, etc. In some implementations, determining the first keyword is included in the current segment includes considering an explicit model of social speech, and explicit model of background sounds, etc.

At 504, executable code 140 determines a second audio event in the current segment of the plurality of segments of digitized speech 108 is a second keyword based on the acoustic feature vectors extracted from the current segment. In some implementations, more than one keyword may be spoken in a segment of digitized speech 108. For example, computing device 110 may be a video game system for playing a voice-controlled video game for two players. A first player may control the forward progress of the character in the video game by speaking the command "go," and a second player may control the vertical motion of the character by speaking the command "jump" to navigate the game. During game play, the first player and the second player may each speak their respective commands. In some implementations, the two keywords may partially or completely overlap. Keyword module 143 may identify the first keyword and the second keyword in the current segment of digitized speech 108 based on feature vectors extracted from the current segment.

At 505, executable code 140 analyzes a context of the second keyword based on the probability distribution vectors of the one or more segments of digitized speech 108 preceding the current segment and the probability distribution vectors of the current segment. In some implementations, computing device 110 may be trained on a plurality of examples of two keywords spoken together. The keywords may be spoken separately, partially overlapping, completely overlapping, etc. Keyword module 143 may compare acoustic feature vectors extracted from the current segment of digitized speech 108 with feature vectors of the second keyword learned during training. Based on the extracted features and keyword training, keyword module 143 may identify the second keyword in the current segment of digitized speech 108. Method 500 continues at 506, where executable code 140 assigns a second classification label to the current segment based on the probability distribution vectors of one or more segments of digitized speech 108 preceding the current segment and the probability distribution vectors of the current segment, the second classification label being one of first command, second command, both first command and second command, social speech, and background.

Based on the plurality of training examples and the features extracted from the current segment of digitized speech 108, executable code may determine the second keyword in digitized speech 108 is a command and not part of background or social speech. In some implementations, executable code 140 may determine the current segment includes the first keyword spoken as a command, the second keyword spoken as a command, both the first keyword and the second keyword spoken as commands, social speech, and/or background. Method 500 continues at 507, where executable code 140 stores the determined plurality of probability distribution vectors in the acoustic features database. In some implementations, executable code may store the determined plurality of probability distribution vectors of the current segment to be used in analyzing the context of subsequent segments of digitized speech 108.

At 508, executable code 140 executes an action based on the classification label assigned to the current segment of digitized speech 108. In some implementations, executing an action may include turning on an oven to preheat or cook, programming the oven to turn on at a particular time, activating and/or programming another speech or voice-controlled device, causing a character in a video game to advance, jump, or both, etc. In some implementations, component 190, under the control of processor 120, may execute the action.

From the above description, it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A system comprising:
   a microphone configured to receive an input speech;
   an analog to digital (A/D) converter configured to convert the input speech from an analog form to a digital form and generate a digitized speech including a plurality of segments having acoustic features;
   a memory storing an executable code; and
   a hardware processor executing the executable code to:
   extract a plurality of acoustic feature vectors from the first segment of the plurality of segments of the digitized speech;
   determine, based on the plurality of acoustic feature vectors, a plurality of probability distribution vectors corresponding to the probabilities that the first segment of the digitized speech includes each of a first keyword, a second keyword, both the first keyword and the second keyword, a background, and a social speech;
   assign a first classification label to the first segment based on an analysis of the plurality of probability distribution vectors of one or more segments preceding the first segment and the probability distribution vectors of the first segment, wherein the assigning of the first classification label to the first segment includes distinguishing between the first keyword and an audio event that is one of the social speech and the background; and
   execute a first action associated with a first command when the first classification label includes the first command.

2. The system of claim 1, wherein the first classification label includes one of the first command, the social speech, and the background.

3. The system of claim 1, wherein executing the first action controls a video game.

4. The system of claim 1, wherein executing the first action controls a robot.

5. The system of claim 1, wherein the hardware processor further executes the executable code to:
   store the determined plurality of probability distribution vectors of the first segment in the acoustic features database.

6. The system of claim 1, wherein the hardware processor executes the executable code to:
   determine a second audio event in the first segment of the plurality of segments of the digitized speech is a second keyword based on the acoustic feature vectors extracted from the first segment;
   analyze a context of the second keyword based on the acoustic features of the one or more segments of the plurality of segments of the digitized speech preceding the first segment;
   assign a second classification label to the first segment based on the context of the second keyword, the second classification label including one of the first command, a second command, both the first command and the second command, the social speech, and the background.

7. The system of claim 6, wherein, when the second classification label includes one of the second command and both the first command and the second command, the hardware processor further executes the executable code to:
   execute a second action associated with the second command.

8. The system of claim 6, wherein the first audio event and the second audio event overlap in the first segment of the plurality of segments of the digitized speech.

9. A method for use with a system having a hardware processor, and a non-transitory memory, the method comprising:
   extracting, using the hardware processor, a plurality of acoustic feature vectors from a first segment of a plurality of segments of a digitized speech;
   determining, using the hardware processor and based on the plurality of acoustic feature vectors, a plurality of probability distribution vectors corresponding to the probabilities that first segment of the digitized speech includes each of a first keyword, a second keyword, both the first keyword and the second keyword, a background, and a social speech;

assigning, using the hardware processor, a first classification label to the first segment based on the plurality of probability distribution vectors of one or more segments preceding the first segment and the probability distribution vectors of the first segment, wherein the assigning of the first classification label to the first segment includes distinguishing between the first keyword and an audio event that is one of the social speech and the background; and executing a first action associated with a first command when the first classification label includes the first command.

10. The method of claim 9, wherein the first classification label includes one of the first command, the social speech, and the background.

11. The method of claim 9, wherein executing the first action controls a video game.

12. The method of claim 9, wherein executing the first action controls a robot.

13. The method of claim 9, further comprising:
storing the determined plurality of probability distribution vectors of the first segment in the acoustic features database.

14. The method of claim 9, further comprising:
determining, using the hardware processor, a second audio event in the first segment of the plurality of segments of the digitized speech is a second keyword based on the acoustic feature vectors extracted from the first segment;

analyzing, using the hardware processor, a context of the second keyword based on the acoustic features of the one or more segments of the plurality of segments of the digitized speech preceding the first segment;

assigning, using the hardware processor, a second classification label to the first segment based on the context of the second keyword, the second classification label including one of the first command, second a command, both the first command and the second command, the social speech, and the background.

15. The method of claim 14, wherein, when the second classification label includes one of the second command and both the first command and the second command, the method further comprises:
executing, using the hardware processor, a second action based on the second command.

16. The method of claim 14, wherein the first audio event and the second audio event overlap in the first segment of the plurality of segments of the digitized speech.

* * * * *